Jan. 11, 1955 M. R. CINES 2,699,422
SEPARATION OF NITROGEN-SUBSTITUTED HYDROCARBONS OF THE
AZA TYPE FROM HYDROCARBONS BY AZEOTROPIC DISTILLATION
Filed Jan. 2, 1951
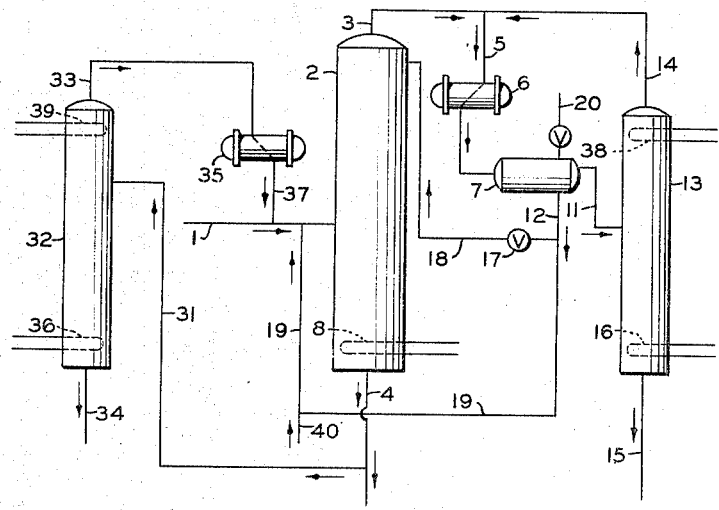
*INVENTOR.*
M. R. CINES
BY
*ATTORNEYS*

United States Patent Office 2,699,422
Patented Jan. 11, 1955

2,699,422

SEPARATION OF NITROGEN-SUBSTITUTED HYDROCARBONS OF THE AZA TYPE FROM HYDROCARBONS BY AZEOTROPIC DISTILLATION

Martin R. Cines, Bartlesville, Okla., assignor to Phillips Petroleum Company, a corporation of Delaware Application January 2, 1951, Serial No. 204,054

12 Claims. (Cl. 202—42)

This invention relates to the separation of nitrogen-containing compounds from admixture with aliphatic hydrocarbons. In one aspect, it relates to a process for the separation of nitrogen-substituted hydrocarbons of the aza type from admixture with aliphatic hydrocarbons by azeotropic distillation with perfluoro compounds as entrainers. In another aspect, it relates to a process for the separation of nitrogen-substituted hydrocarbons of the aza type from admixture with close-boiling aliphatic hydrocarbons by azeotropic distillation with nonacidic perfluoro compounds as entrainers.

The separation of volatile compounds by azeotropic distillation is well known and is practiced to effect separations which are difficult or even impossible by ordinary distillation methods. The mixtures of volatile compounds which can be separated in many instances have such volatility characteristics that ordinary distillation yields only one component of acceptable purity, and in some instances substantially no separation at all is effected. This difficulty in effecting separations by fractional distillation may be due to the formation of constant boiling mixtures or azeotropes, or it may be that the boiling points of the components are so close together that columns of a practical number of plates are ineffective. In order to separate such mixtures, solvent extraction or azeotropic distillation processes may be used. In the process of azeotropic distillation, an additional volatile component is added which so alters the volatilities of the original constituents that satisfactory separation in a fractionating column of practical size becomes possible. In order for the azeotropic distillation to be useful, separation and recovery of the entrainer from the product must be possible. Most azeotropes, as is well known, are of the low-boiling or minimum-boiling point type, although some high-boiling or maximum-boiling point ones are known. In this type of distillation, the entrainer is added to the system, and it preferentially azeotropes with one or more of the components during the distillation. The azeotrope of the entrainer with one or more components of the admixture which are desired to be separated has a greater volatility than the remaining component or components and/or azeotrope thereof. Upon separation of the entrainer from the azeotropic mixture by any of various known means, the separation of the original mixture has been effected. In case any entrainer remains in solution in the still bottoms, it may be separated therefrom to complete the separation and recovery process. Normally, however, the amount of entrainer employed is adjusted so that substantially all is taken overhead and the kettle product is substantially entrainer-free.

One object of my invention is to provide a process for th separation of aza type nitrogen-substituted hydrocarbons from close-boiling hydrocarbons.

Another object of my invention is to provide a process for the separation of a narrow-boiling range mixture of aliphatic hydrocarbons and nitrogen-substituted hydrocarbons of the aza type into aliphatic hydrocarbons and nitrogen-substituted hydrocarbons of the aza type.

Still another object of my invention is to provide a process for the separation of aliphatic hydrocarbons from nitrogen-substituted hydrocarbons of the aza type having substantially the same boiling points.

Still other objects and advantages of my process will be realized upon reading the following disclosure which, taken with the attached drawing, forms a part of the specification.

The drawing represents, diagrammatically, one arrangement of apparatus parts in which to practice the process of my invention.

The molecules to be included within the term "aza" as herein contemplated contain only C, H, and N atoms. The term "aza type" or "compound of the aza type" is herein intended to refer to organic compounds in which one or more of the carbon atoms from the chain or ring are replaced by one or more amino nitrogen atoms. For example, pyridine in this respect is aza benzene and 3-amino pentane is considered to be an ethyl aza butane. This latter compound may be represented by the formula

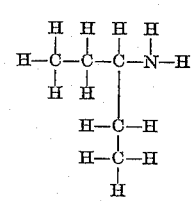

I have now found a method whereby the nitrogen-substituted hydrocarbons of the aza type, such as the aliphatic and aromatic amines, and the ring nitrogen cyclic compounds may be removed from aliphatic hydrocarbons or mixtures thereof. This new process removes the nitrogen-substituted hydrocarbons of the aza type by means of azeotropic distillation in the presence of an entrainer selected from the group of nonacidic organic perfluoro compounds whereby the nitrogen-substituted hydrocarbons are removed overhead along with entrainer and the aliphatic hydrocarbon or hydrocarbons are removed as kettle product. Ordinarily azeotropic distillation equipment may be used in effecting this separation.

By the term "perfluoro compound" or "perfluoro organic compounds" as used throughout this specification and claims, I refer to completely fluorinated organic compounds. By completely fluorinated organic compounds, it is meant that all the hydrogen atoms of the organic compounds which are directly bonded to carbon atoms are replaced by fluorine atoms. For example, a seven carbon atom straight-chain compound in terms of hydrocarbon is called normal heptane. When all of the hydrogens of this normal heptane hydrocarbon are replaced by fluorine atoms, the compound may be termed perfluoro normal heptane. The paraffin compounds, in general, when completely fluorinated, may be termed "perfluoroparaffins." When cyclic paraffins are completely fluorinated, they may be termed perfluorocycloparaffins, an example of which is perfluorocyclohexane. Alkyl derivatives of these perfluorocycloparaffins are also used. Dialkyl ethers, such as dibutyl ether, may be completely fluorinated and forms perfluorodinormal-butyl ether. Substituted ammonia or amino compounds, such as mono-, di-, or trialkyl amines, may be completely fluorinated as, for example, perfluorotri-n-butylamine, tripropylamine, etc. All of these completely fluorinated organic compounds are nonacidic compounds as contemplated herein. Some of the aforementioned perfluoro compounds and their corresponding normal boiling points in degrees Fahrenheit are as follows:

| | °F. |
|---|---|
| Perfluoromethylcyclohexane | 163–172 |
| Perfluoro-n-heptane | 181 |
| Perfluorodi-n-butyl ether | 212 |
| Perfluorotripropylamine | 265 |
| Perfluorotri-n-butylamine | 351 |

Other compounds of similar chemical characteristics are satisfactory. It is preferable to employ an entrainer having a boiling point within 50° F. of the nitrogen-substituted hydrocarbon. Entrainers having boiling points over 50° F. from that of the nitrogen-substituted hydrocarbon to be removed are less effective and sometimes ineffective. It is preferable when aliphatic hydrocarbon mixtures are to be processed by this invention for the removal of nitrogen-substituted hydrocarbons of the aza type, that the boiling range of the hydrocarbon be not over 50° F. and is more preferably not over 25° F. The term narrow-boiling range fraction is intended to mean a 50° fraction, and preferably a 25° fraction.

Conventional azeotropic distillation columns may be used, for example, such packed columns as bubble cap columns, perforated plate columns, or the like. As in other distillations, columns having a large number of theoretical plates will effect better separation than columns having a smaller number of theoretical plates. In some instances, satisfactory operation by my process can be effected with a column having as few as five theoretical plates; while for other separations, columns having a greater number of theoretical plates are required. The number of theoretical plates will depend, of course, upon such conditions as the compounds concerned and the degree of separation desired, as well as the particular entrainer used and the relative volatility of the compound in the presence of the entrainer.

The operation of this process is quite similar to the usual azeotropic distillation process in that the entrainer and the mixture to be purified are charged to a fractionating column and the azeotrope of the nitrogen-substituted hydrocarbon or hydrocarbons of the aza type are removed overhead and the purified hydrocarbon removed as the kettle product. The entrainer is then recovered from the overhead product and recycled to the column for further use. No consumption of the entrainer other than normal handling losses is encountered.

Distillations are usually carried out at pressures of about atmospheric or slightly above atmospheric as, for example, about 50 pounds per square inch gage. Higher pressures may be used if such be desirable from the standpoint of facilitating processing.

In my process, separation of the azeotropic mixture of nitrogen-substituted hydrocarbon and entrainer is readily effected. Upon condensation of the azeotrope vapor and cooling, two liquid phases are formed. The lighter phase is the nitrogen-substituted hydrocarbon in which some perfluoro organic compound is ordinarily dissolved and the heavier phase is largely perfluoro compound having some nitrogen-substituted hydrocarbon in solution. The heavier phase may ordinarily be directly recycled to the azeotrope distillation column as entrainer with the feed stock. The hydrocarbon phase having some entrainer in solution upon distillation is freed from entrainer as azeotrope and the remaining hydrocarbon is removed from the kettle section of the column as a separated product of the process.

Referring now to the drawing, reference numeral 2 refers to a distillation column or still which, when used in azeotropic distillation is frequently termed an "azeo" column. This fractionating tower or azeo column may be a more or less conventional bubble cap tower, packed tower, or the like. A reboiler coil 8 is positioned in the kettle section for addition of reboiling heat. Column 13 is likewise an azeotropic distillation column but, as will be subsequently described, this column may be a smaller column, that is, one having a smaller capacity than the main column 2. A third distillation column 32 is provided for use under special conditions. The columns 13 and 32 may be provided with bubble cap tray assemblies or any desired type of packing suitable for use in the separation steps to be carried out in these columns. Reboiler coils 16 and 36 are provided in columns 13 and 32, respectively, for furnishing heat for the distillation operations. Units 6 and 35 are condensers. These condensers are preferably water-cooled condensers and are intended to condense completely the vaporous products passing through their respective vapor inlet lines. Vessel 7 is merely a phase separation tank in which two immiscible liquid phases are permitted to separate by gravity.

As an example of the operation of this apparatus for carrying out the process of my invention, a charge stock containing a mixture of monoamylamine and 2,3-dimethylpentane is introduced into fractionator 2 through line 1 from a source, not shown. The entrainer, perfluoro-n-heptane, is passed through line 19 from an operation subsequently described into the feed line 1 so that a mixture of the two liquids, the feed stock and the entrainer, is introduced into the fractionator 2 at about a midpoint. A sufficiently high temperature is maintained in the kettle section of this column through the reboiler coil 8 to distill overhead an azeotropic mixture of the monoamylamine and entrainer at a temperature below the normal boiling temperatures of the monoamylamine and the 2,3-dimethylpentane. Whether or not the 2,3-dimethylpentane forms an azeotrope with the entrainer is immaterial. In this particular example, if the 2,3-dimethylpentane forms an azeotrope with the entrainer, its volatility is such that it remains as still bottoms and the monoamylamine - perfluoro - normal - heptane azeotrope passes overhead as column overhead product. This vaporous overhead product is passed through lines 3 and 5 into condenser 6 in which condensation of the vapor occurs. The liquid condensate flows on into the separator or accumulator tank 7 in which liquid monoamylamine and the entrainer separate as two liquid phases. The perfluoro-normal-heptane compound settles to the bottom since it is specifically heavier than the monoamylamine. In the monoamylamine layer, there is dissolved a small quantity of the perfluoro-normal-heptane, while a small quantity of the monoamylamine remains dissolved in the perfluoro compound layer.

The lower or perfluoro-normal-heptane layer is removed from separator 7 through a pipe 12. To reflux the main azeotrope column 2, a portion of the perfluoro compound layer passing through line 12 is by-passed through line 18 containing valve 17 and introduced into the azeo column 2 at the proper refluxing point. The main portion of this perfluoro compound layer containing, as mentioned, a small amount of dissolved monoamylamine is passed from line 12 through line 19 and is added to the original feed stock to the azeo column 2. This portion of the entrainer is the portion referred to above as originating from an operation to be described.

If desired, a closed reflux coil, not shown, may be provided in the upper portion of column 2 for refluxing or closed coil refluxing may be used in conjunction with the perfluoro material flowing through line 18.

The monoamylamine layer containing some dissolved perfluoro compound is removed from the accumulator 7 through line 11 and is introduced into the distillation column 13. Heat for distillation is added to this column from the reboiler coil 16, while refluxing may be effected by passing a coolant through reflux coil 38. This column is so operated that the small amount of dissolved perfluoro-normal-heptane compound is vaporized with the corresponding amount of the monoamylamine as azeotrope, and this vaporous material is passed through line 14 and line 5 into condenser 6. This azeotropic vapor passing from column 13 through line 14 has the same composition as the azeotropic vapor passing through line 3 when columns 13 and 2 are operated under the same pressure. Since these two vapor streams possess the same or substantially the same composition, the vapor streams are combined in line 5 and the combined streams condensed in condenser 6 and the condensate passed into the separator 7 for separation of the liquid phases, as discussed above. Line 20 is provided with a pressure relief valve in case relief of pressure from tank 7 is necessary. Makeup perfluoro compound as needed may be added to the system through line 40.

Since the amount of perfluoro compound contained in the amylamine layer in tank 7 is usually small, the amount of azeotropic vapor passing through line 14 is, likewise, small. It is intended that all of the perfluoro compounds be distilled overhead in this recovery column 13. By removing all of the perfluoro compound overhead it leaves a pure monoamylamine product in the kettle, and this material is removed from the kettle through line 15 as one of the products of the process. This amine product may be passed to the storage tank or subsequent disposal, as desired, and not shown.

In the operation of the main azeotrope column 2, it is intended that approximately the exact amount of entrainer be added with the charge stock to vaporize the entire monoamylamine content of the feed stock. If an excess of entrainer is added at this point, the excess over that required to form the azeotrope with the monoamylamine will accumulate in the still bottoms and will be removed with the bottoms through line 4. When the amount of entrainer carried in the still bottoms warrants recovery, a still 32 with its auxiliary equipment is required.

As mentioned above, the preferred method of operation is to add the required amount of entrainer with the feed stock. However, the addition of the exact amount of entrainer is difficult to realize under conditions of normal plant operation. A determining factor as to whether an excess or a deficiency of entrainer is added to the feed stock is the product or products to be produced. If the 2,3-dimethylpentane, for example, is to be a pure compound or is to be used for octane improvement purposes, all of the perfluoro-normal-heptane should, of course, be removed. It might be better to lose a slight amount of the 2,3-dimethylpentane overhead than to contaminate this material with some of the amylamine which, as is known, has a low octane number. When producing a dimethylpentane product of commercial or technical grade, this product may then be permitted to contain some amylamine and yet meet commercial or technical grade specifications.

However, in those cases when an excess of entrainer is used in the main azeo column 2, and this excess entrainer is permitted to remain in the azeo still bottoms, the 2,3-dimethylpentane bottoms containing this excess entrainer is passed through lines 4 and 31 and introduced into the distillation column 32, as shown. Distillation column 32 is operated in such a manner that an azeotropic mixture of 2,3-dimethylpentane and entrainer is removed through the overhead vapor line 33. This vapor is condensed in condenser 35 and the condensate passed through line 37 and introduced into the main azeotrope column 2 with the feed stock and main quantity of entrainer from line 19. This condensate may be added to the plant feed stock since its amount will ordinarily be small. The excess 2,3-dimethylpentane over that required to form the azeotrope in column 32 accumulates in this column as still bottoms and is removed through line 34 and passed to storage, not shown, or to any subsequent use desired. Column 32 is provided with a closed reflux coil 39.

The particular pressures carried in columns 2, 13 and 32 are not critical, and I prefer to use pressures from atmospheric up to about 50 pounds per square inch gage. Some pressure greater than atmospheric is ordinarily required to cause flow of product or material from one stage of the process to the next. One disadvantage of using higher pressures in these stills is that higher reboiler temperatures are required to effect the distillation steps.

The above description is intended to be illustrative of the operation of my process for the separation of two close-boiling materials. When separating an amine of the aza type from a close-boiling fraction containing a plurality of aliphatic hydrocarbons, substantially the same procedure is practiced. For example, if a feed stock fraction boiling within a temperature range up to 50° F. and containing at least one amine compound of the aza type and aliphatic hydrocarbon compounds, the amine material will be removed from the system through the bottoms drawoff line 15 from still 13 while the aliphatic hydrocarbons will be removed through the bottoms drawoff line 4 from still 2. In a separation of this type, the use of a deficiency, an excess, or the exactly correct amount of entrainer may be determined by the separation to be made and/or by the products desired.

Whether operating to separate one amine compound from aliphatic hydrocarbons or one or more compounds of the aza type from a fraction containing a plurality of aliphatic hydrocarbons, the entrainer should have a boiling point within at least 50° F. of the boiling point of the amine compound to be taken overhead as azeotrope. This 50° F. temperature difference may be 50° below or 50° above the boiling point of the amine compound. It is preferred, however, to use an azeotrope former boiling within about 25° F. above or below the boiling point of the amine compound or compounds to be taken overhead from the azeo column 2.

The following examples are illustrative of the effectiveness of this process. The first run was carried out in a small distillation column consisting of a two-foot section of glass tubing approximately six mm. inside diameter and containing a single wire spiral for packing. The column was insulated by a vacuum jacket and equipped with a suitable kettle and a total condensing head with a liquid takeoff. This column was equivalent to approximately five theoretical plates. The second run, reported in Table II below, was made in a 13 mm. Hypercal column.

Table I.—Azeotropic distillation data

| System | B. P., °F. | Charge, Vol. Percent | Overhead Data | | |
|---|---|---|---|---|---|
| | | | Composition, Vol. Percent | Temp., °F. | Liquid Phases |
| Monoamylamines | 199–204 | 27.3 | 17 | | |
| 2-3 dimethylpentane | 193.5 | 45.4 | 17 | 150–154 | two. |
| Perfluoro-n-heptane | 181.0 | 27.3 | 66 | | |

The above data were obtained at atmospheric pressures. In making the run, the kettle was charged with the mixture of monoamylamine and 2,3-dimethylpentane with a small amount of the entrainer, perfluoro-n-heptane. The column was then started in operation and when equilibrium was reached, an overhead sample was taken. The overhead product of this run was homogeneous at the boiling point, but it separated into two liquid phases upon cooling to room temperature.

It should be noted that the effectiveness of this entrainer is quite evident in this run, for even though the monoamylamine and the 2,3-dimethylpentane were close boiling, the very low efficiency column (about 5 theoretical plates or less) effected quite the substantial concentration of the amine in the overhead product based on the entrainer-free material.

Table II.—Azeotropic distillation run data

| System | B. P., °F. | Charge, Vol. Percent | Overhead Data | | |
|---|---|---|---|---|---|
| | | | Composition, Vol. Percent | Temp., °F. | Liquid Phases |
| Di-n-propylamine | 231.3 | 40.0 | 40.8 | | |
| Dimethylhexane concentrate of an HF alkylate | 230–1 | 40.0 | 13.0 | 210–1 | two. |
| Perfluoro-tri-n-propylamine | 265.0 | 20.0 | 46.2 | | |

The particular perfluoro compound to be selected for making a particular separation will need to be selected so that its boiling point will lie within 50° F. of the amine material of the aza type to be taken overhead.

Valves, pumps, pressure and temperature recording and control apparatus, level controllers and such auxiliary apparatus are not shown in the drawing nor described in this specification for purposes of simplicity. Those skilled in the art understand the necessity for the use of such auxiliary equipment.

The above-described flow diagram and the examples described are given for illustrative purposes only and should not be regarded as limiting the invention, the scope of which is set forth in the following claims.

I claim:

1. In the refining of hydrocarbon materials containing a nitrogen compound of the chain substituted aza type for removal from the hydrocarbons, the steps comprising admixing with a narrow boiling range of hydrocarbons and a nitrogen compound of the chain substituted aza type an organic perfluoro compound having a normal boiling point within 50° F. of the boiling point of said nitrogen compound of the aza type, said organic perfluoro compound being selected from the group consisting of perfluoromethylcyclohexane, perfluoro-n-heptane, perfluoro-di-n-butyl ether, perfluorotripropylamine and perfluorotri-n-butylamine, subjecting the admixture to distillation conditions, and recovering hydrocarbons free from said nitrogen compound from the distillation kettle product.

2. In the refining of hydrocarbons containing a compound of the chain substituted aza type for removal from the hydrocarbons, the steps comprising admixing with a narrow boiling range mixture of aliphatic hydrocarbons and a nitrogen compound of the chain substituted aza type an organic perfluoro compound having a normal boiling point within 50° F. of the boiling point of said nitrogen compound of the aza type, said organic perfluoro compound being selected from the group consisting of perfluoro-methylcyclohexane, perfluoro-n-heptane, perfluorodi-n-butyl ether, perfluorotripropylamine and perfluorotri-n-butylamine, subjecting the admixture to distillation conditions, and recovering said aliphatic hydrocarbons free from said nitrogen compound from the distillation kettle product.

3. In the refining of hydrocarbons the improvement comprising subjecting a narrow boiling range admixture of an aliphatic hydrocarbon and a nitrogen compound of the chain substituted aza type to distillation conditions in the presence of an organic perfluoro compound having a normal boiling point within 50° F. of the boiling point of said nitrogen compound of the aza type, said organic perfluoro compound being selected from the group consisting of perfluoromethylcyclohexane, perfluoro-n-heptane, perfluorodi-n-butyl ether, perfluorotripropylamine and perfluorotri-n-butylamine, recovering said aliphatic hydrocarbon from the distillation bottoms and recovering said organic perfluoro compound and the nitrogen compound of the aza type as separate products from the overhead distillate.

4. In the refining of hydrocarbons the improvement comprising subjecting a narrow boiling range mixture of aliphatic hydrocarbons containing an impurity comprising an organic nitrogen compound of the aza type to distillation conditions in the presence of a completely fluorinated organic compound selected from the group of compounds consisting of perfluoromethylcyclohexane, perfluoro-n-heptane, perfluoro-di-n-butyl ether, perfluorotripropylamine and perfluorotri-n-butylamine, as an entrainer, condensing the overhead vapors, separating the condensate into a liquid phase rich in said organic nitrogen compound of the aza type and containing some of said completely fluorinated organic compound in solution and a completely fluorinated organic compound phase containing at least some of said organic nitrogen compound in solution, recycling this latter phase into the original distillation operation as said completely fluorinated organic compound, subjecting the separated liquid phase rich in said organic nitrogen compound to distillation conditions, condensing the overhead vapors from this latter distillation operation and adding the condensate to the first mentioned distillation operation, removing still bottoms from this second distillation operation as one product of the process and removing the still bottoms from the first mentioned distillation operation as a second product of the process.

5. The process of claim 3 wherein the organic perfluoro compound is perfluoro-methylcyclohexane.

6. The process of claim 3 wherein the organic perfluoro compound is perfluoro-di-n-butyl ether.

7. The process of claim 3 wherein the organic perfluoro compound is perfluoro-tri-n-butylamine.

8. The process of claim 3 wherein the organic perfluoro compound is perfluoro-tri-n-propylamine.

9. The process of claim 3 wherein the perfluoro compound is perfluoro-tri-n-propyl amine, the aliphatic hydrocarbon is a dimethylhexane concentrate of an HF alkylate, and the aza type nitrogen compound is a di-n-propylamine.

10. A process which comprises subjecting a narrow boiling range mixture of an aliphatic hydrocarbon and an organic nitrogen compound of the aza type to distillation conditions in the presence of perfluoro-n-heptane, said organic compound of the aza type boiling within 50° F. of the boiling point of the perfluoro-n-heptane, separating an overhead distillation product from a bottoms product, recovering the aliphatic hydrocarbon from the bottoms product and recovering the perfluoro-n-heptane from the overhead distillate.

11. A process which comprises subjecting a mixture of 2,3-dimethylpentane and monoamylamine to distillation conditions in the presence of perfluoro-n-heptane, separating an overhead distillation product from a bottoms product, recovering the 2,3-dimethylpentane from the bottoms and recovering the perfluoro-n-heptane from the overhead distillate.

12. In the refining of aliphatic hydrocarbon materials containing 2,3-dimethylpentane and monoamylamine for removal of the latter from the hydrocarbon, the steps comprising admixing perfluoro-n-heptane with a mixture of 2,3-dimethylpentane containing monoamylamine, subjecting the admixture to distillation conditions and recovering hydrocarbon free from said monoamylamine from the distillation kettle product.

References Cited in the file of this patent

UNITED STATES PATENTS

| | | |
|---|---|---|
| 2,290,636 | Deanesly | July 21, 1942 |
| 2,365,912 | Sonders, Jr. | Dec. 26, 1944 |
| 2,442,589 | Evans et al. | June 1, 1948 |
| 2,477,303 | Lake et al. | July 26, 1949 |